(12) United States Patent
Ikuno

(10) Patent No.: US 10,244,142 B2
(45) Date of Patent: Mar. 26, 2019

(54) IMAGE PROCESSING APPARATUS THAT CARRIES OUT FACSIMILE COMMUNICATIONS, CONTROL METHOD THEREFOR, AND STORAGE MEDIUM

(71) Applicant: CANON KABUSHIKI KAISHA, Tokyo (JP)

(72) Inventor: Takao Ikuno, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/630,097

(22) Filed: Jun. 22, 2017

(65) Prior Publication Data
US 2018/0007230 A1   Jan. 4, 2018

(30) Foreign Application Priority Data
Jul. 4, 2016   (JP) .................................. 2016-132535

(51) Int. Cl.
| | | |
|---|---|---|
| *H04N 1/333* | (2006.01) | |
| *H04N 1/00* | (2006.01) | |
| *H04N 1/411* | (2006.01) | |

(52) U.S. Cl.
CPC ....... *H04N 1/33346* (2013.01); *H04N 1/0022* (2013.01); *H04N 1/411* (2013.01); *H04N 2201/0094* (2013.01)

(58) Field of Classification Search
None
See application file for complete search history.

(56) References Cited

U.S. PATENT DOCUMENTS

2013/0050769 A1* 2/2013 Hama ................ H04N 1/00217
                                                 358/426.08
2017/0031829 A1* 2/2017 Wokhlu .............. G06F 12/0879

FOREIGN PATENT DOCUMENTS

JP         2003092671 A       3/2003

* cited by examiner

*Primary Examiner* — Frantz Bataille
(74) *Attorney, Agent, or Firm* — Rossi, Kimms & McDowell LLP (57) ABSTRACT

An image processing apparatus which is capable of reducing situations in which a job cannot be executed because resources are being in use for another job. The image processing apparatus has a soft codec unit that carries out an encoding process on image data, and a hard codec unit that carries out an encoding process on the image data at high speed compared with the soft codec unit. When a second job received while the hard codec unit is in use for a first job for which use of the soft codec unit is allowed requires use of the hard codec unit, control is provided to switch a codec unit for use in the first job from the hard codec unit to the soft codec unit.

16 Claims, 4 Drawing Sheets

IMAGE PROCESSING APPARATUS THAT CARRIES OUT FACSIMILE COMMUNICATIONS, CONTROL METHOD THEREFOR, AND STORAGE MEDIUM

BACKGROUND OF THE INVENTION

Field of the Invention

The present invention relates to an image processing apparatus, a control method therefor, and a storage medium.

Description of the Related Art

An MFP which is an image processing apparatus that sends and receives image data through facsimile communications is known. In a facsimile communication, encoded image data is sent and received, and upon receiving encoded image data from an external apparatus, the MFP decodes the encoded image data. The MFP has a plurality of codec modules which carry out an encoding-decoding process, for example, a hardware codec module (hereafter referred to as a "hard codec") and a software codec module (hereafter referred to as a "soft codec"). The soft codec performs processing at low speed and is used for, for example, an analog fax job in which a facsimile communication (hereafter referred to as an "analog fax communication") is carried out via an analog telephone network that does not require execution of a high-speed encoding-decoding process. On the other hand, the hard codec has an upper limit to the number of resources, but performs processing at higher speed compared with the soft codec and is used for, for example, a print job in which a printing process is carried out based on print data from a PC. The reason why the hard codec is used for the print job is that the print job requires execution of the high-speed encoding-decoding process.

In recent years, there are cases where the MFP carries out a facsimile communication over an IP network (hereafter referred to as an "IP-FAX communication"), a communication speed of which is higher than that of an analog fax communication, and an appropriate route is controlled for the facsimile communication (see, for example, Japanese Laid-Open Patent Publication (Kokai) No. 2003-92671). In an IP-FAX communication job in which the IP-FAX communication is carried out, the MFP may carry out the encoding-decoding process using the soft codec, but there may be a case where the MFP uses the hard codec so as to reduce the processing time required for the encoding-decoding process.

However, there may be a case where, while the hard codec is in use for the IP-FAX communication, the MFP receives an instruction to execute another job such as a print job which requires use of the hard codec during the IP-FAX communication. In this case, the MFP cannot use resources of the hard codec until execution of the IP-FAX communication is completed. As a result, the MFP cannot execute the print job until execution of the IP-FAX communication is completed.

SUMMARY OF THE INVENTION

The present invention provides an image processing apparatus and a control method therefor which are capable of reducing situations in which a job cannot be executed because resources are in use for another job, as well as a storage medium.

Accordingly, the present invention provides an image processing apparatus that has a first codec unit that carries out an encoding process on image data, and a second codec unit that carries out another encoding process on the image data at higher speed compared with the first codec unit, comprising a job execution control unit configured to control execution of a job including the encoding process, a determination unit configured to determine a codec unit for use in the job, and a switching control unit configured to, when a second job received while the second codec unit is in use for a first job for which use of the first codec unit is allowed requires use of the second codec unit, provide control to switch a codec unit for use in the first job from the second codec unit to the first codec unit.

According to the present invention, situations in which a job cannot be executed because resources are in use for another job are reduced.

Further features of the present invention will become apparent from the following description of exemplary embodiments (with reference to the attached drawings).

DESCRIPTION OF THE EMBODIMENTS

Hereafter, an embodiment of the present invention will be described in detail with reference to the drawings.

Figure 1:
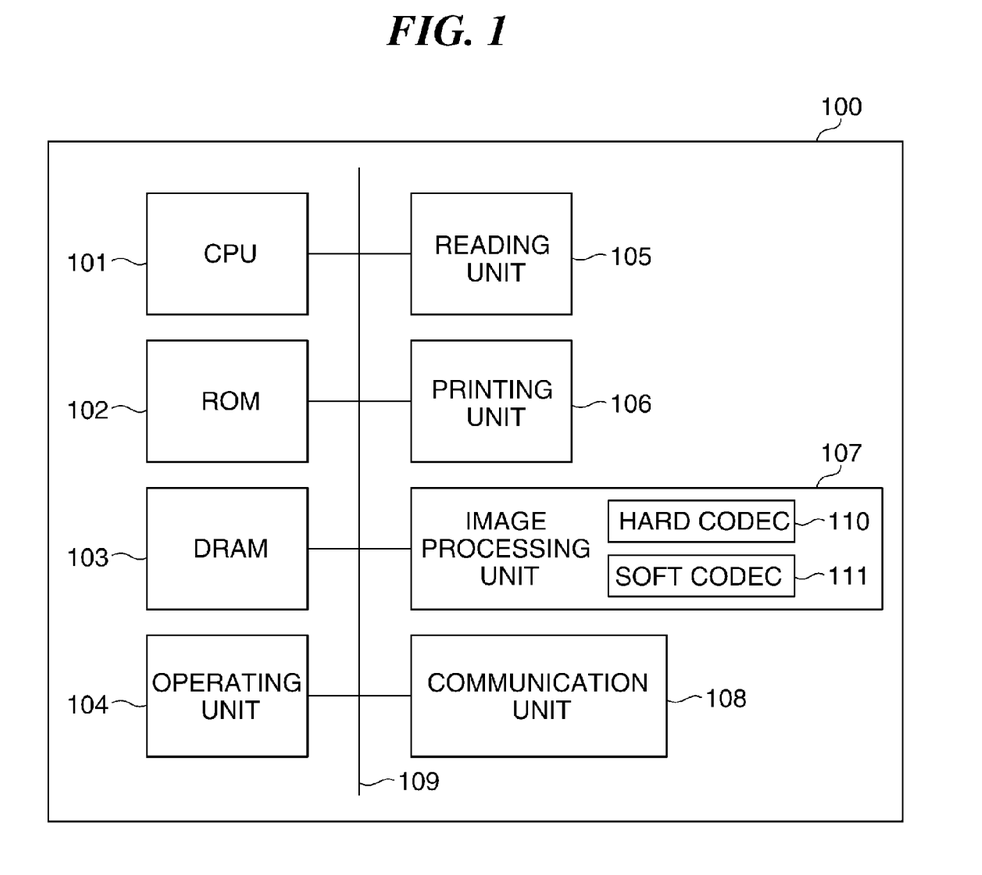
FIG. 1 is a block diagram schematically showing an arrangement of an MFP which is an image processing apparatus according to an embodiment of the present invention.

FIG. 1 is a block diagram schematically showing an arrangement of an MFP 100 which is an image processing apparatus according to an embodiment of the present invention.

Referring to FIG. 1, the MFP 100 has a CPU 101, a ROM 102, a DRAM 103, an operating unit 104, a reading unit 105, a printing unit 106, an image processing unit 107, and a communication unit 108. The CPU 101, the ROM 102, the DRAM 103, the operating unit 104, the reading unit 105, the printing unit 106, the image processing unit 107, and the communication unit 108 are connected to one another via a system bus 109. The image processing unit 107 has a hard codec 110 and a soft codec 111.

The MFP 100 executes jobs such as a printing process and a scanning process. The MFP 100, which has an image communicating function, sends and receives image data through facsimile communications such as an analog fax communication and an IP-FAX communication. The CPU 101 provides various types of control by executing programs stored in the ROM 102. For example, the CPU 101 controls execution of jobs (job execution control unit). The ROM 102 is a flash memory such as eMMC and stores programs, which are to be executed by the CPU 101, and a variety of data. The DRAM 103 is a volatile memory and used as a temporary storage area for a variety of data. The operating unit 104 is a user interface of the MFP 100 and receives, for example, instructions to execute various jobs from a user. The reading unit 105 reads an image off an original placed on an original platen glass, not shown, and converts the image into image data. The printing unit 106 prints the image data obtained as a result of the conversion by the reading unit 105 on a recording sheet. The image processing unit 107 subjects the obtained image data to an encoding-decoding process.

The hard codec 110 has an upper limit to the number of resources and carries out the encoding-decoding process at high speed. For example, the hard codec 110 is used for execution of a print job in which the printing process is carried out based on print data obtained from an external PC (personal computer) and which requires execution of a high-speed encoding-decoding process. When there is a need to reduce the processing time for the encoding-decoding process, the hard codec 110 is used for execution of an IP-FAX communication job as well. The soft codec 111 carries out the encoding-decoding process using functions of the CPU 101. The soft codec 111 has no upper limit to the number of resources and carries out the encoding-decoding process at low speed. For example, the soft codec 111 is used for execution of an analog FAX communication job and the IP-FAX communication job. The communication unit 108 controls communications with external communication networks such as an analog telephone network and an IP network, not shown, to control analog FAX communications, IP-FAX communications, and so forth.

Figure 2:
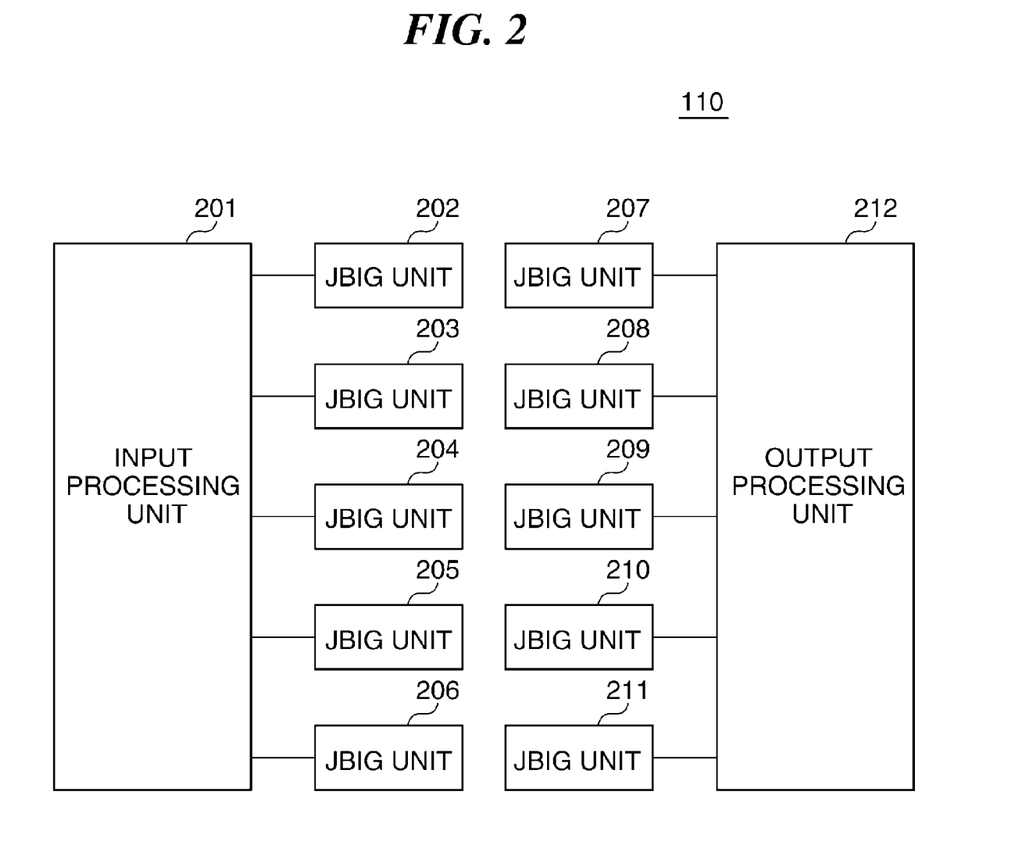
FIG. 2 is a block diagram schematically showing an arrangement of a hard codec in FIG. 1.

FIG. 2 is a block diagram schematically showing an arrangement of the hard codec 110 in FIG. 1.

Referring to FIG. 2, the hard codec 110 has an input processing unit 201, JBIG units 202 to 211, and an output processing unit 212. The input processing unit 201 is connected to the JBIG units 202 to 206, and the output processing unit 212 is connected to the JBIG units 207 to 211. In the present embodiment, each of the JBIG units 202 to 211 is a resource of the hard codec 110 which carries out the encoding-decoding process, and "10" which means the number of JBIG units provided in the hard codec 110 is the upper limit to the number of resources of the hard codec 110. A description will now be given of how the hard codec 110 operates in a case where a printing process, for example, is carried out.

In the printing process, the input processing unit 201 carries out a color conversion process or the like on image data, which is obtained as a result of conversion by the reading unit 105, to generate color-converted image data of respective four colors, specifically, CMYK colors and outputs the color-converted image data of the respective CMYK colors to the JBIG units 202 to 205. The JBIG units 202 to 205 encode the color-converted image data obtained from the input processing unit 201 and send the encoded color-converted image data to the DRAM 103. As a result, the encoded color-converted image data is stored in the DRAM 103. The JBIG units 207 to 210 decode the color-converted image data stored in the DRAM 103 and output the decoded color-converted image data to the output processing unit 212. The output processing unit 212 converts the color-converted image data obtained from the JBIG units 207 to 210 into an electric signal and sends this electric signal to the printing unit 106. As a result, the printing unit 106 performs printing on a recording sheet based on the electric signal sent from the output processing unit 212.

Here, there may be a case where the print job to be executed by the MFP 100 includes execution of an image analyzing process as well as execution of the printing process. In this case, not only the encoding-decoding process described above is carried out, but also the JBIG unit 206 decodes image data stored in the DRAM 103, the input processing unit 201 carries out the image analyzing process on the decoded image data, and the JBIG unit 211 encodes the decoded image data again. Namely, all the resources of the hard codec 110 are used for the print job. On the other hand, in the IP-FAX communication, one JBIG unit is used to carry out a decoding process for data that is sent and received, and another JBIG unit is used to carry out an encoding process on the data. Namely, two resources of the hard codec 110 are used for the IP-FAX communication job. For example, when the print job that requires all the resources of the hard codec 110 is received while two resources of the hard codec 110 are in use for the IP-FAX communication job, the resources required for the print job cannot be reserved. For this reason, the MFP 100 cannot execute the print job until it completes execution of the IP-FAX communication job.

To cope with this, in the present embodiment, when a job received while the hard codec 110 is in use for execution of the IP-FAX communication job requires use of the hard codec 110, the CPU 101 switches the codec module (codec unit) for use in the IP-FAX communication job from the hard codec 110 to the soft codec 111.

Figure 3:
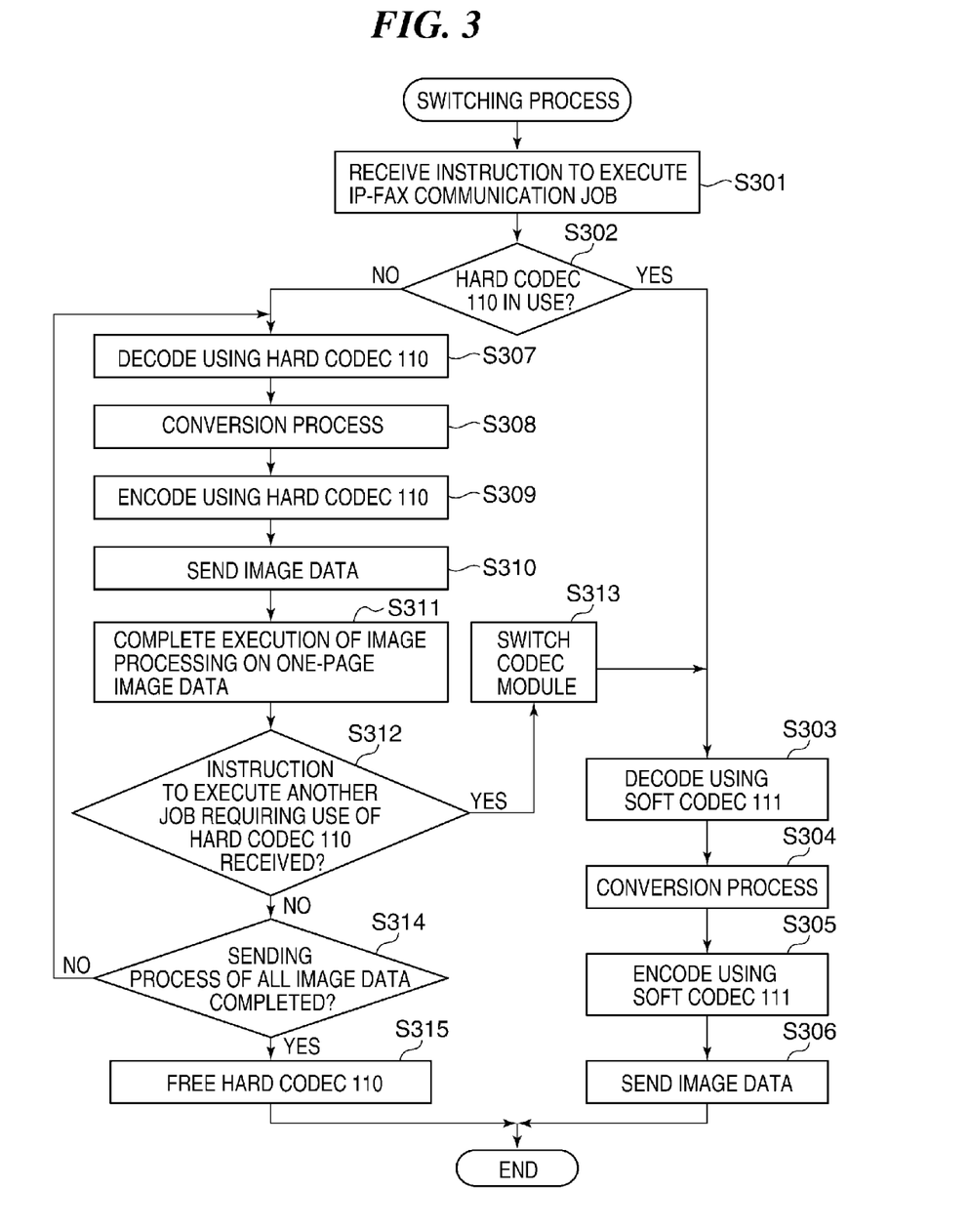
FIG. 3 is a flowchart showing the procedure of a switching process which is carried out by the MFP in FIG. 1.

FIG. 3 is a flowchart showing the procedure of a switching process which is carried out by the MFP 100 in FIG. 1.

The process in FIG. 3 is carried out by the CPU 101 executing a program stored in the ROM 102. The process in FIG. 3 is based on the assumption that, for example, an instruction to execute the IP-FAX communication job in which images on a plurality of pages are faxed over IP has been received, and the image data on the pages that have been encoded is stored in advance in the DRAM 103.

Referring to FIG. 3, first, upon receiving the instruction to execute the IP-FAX communication job in which the images on the plurality of pages are faxed over IP (step S301), the CPU 101 checks usage of the hard codec 110. Next, the CPU 101 determines whether or not the hard codec 110 is in use (step S302).

As a result of the determination in the step S302, when the hard codec 110 is in use, the CPU 101 performs image processing in steps S303 to S305, to be described later, on all of the image data for the IP-FAX communication job. Specifically, the CPU 101 obtains, from the DRAM 103, one-page image data from the image data on the plurality of pages for the IP-FAX communication job and decodes the obtained one-page image data using the soft codec 111 (step S303). Then, the CPU 101 subjects the decoded one-page image data to a conversion process (step S304) and encodes the one-page image data, which has been subjected to the conversion process, using the soft codec 111 (step S305). The CPU 101 then sends the encoded one-page image data to a communication destination using the communication unit 108 (step S306). After that, the CPU 101 performs the image processing in the steps S303 to S306 on all of the image data for the IP-FAX communication job and ends the present process.

As a result of the determination in the step S302, when the hard codec 110 is not in use, the CPU 101 performs image processing in steps S307 to S309, to be described later, on all of the image data for the IP-FAX communication job. Specifically, the CPU 101 obtains, from the DRAM 103, one-page image data from the image data on the plurality of pages for the IP-FAX communication job and decodes the obtained one-page image data using the hard codec 110 (step S307). Then, the CPU 101 subjects the decoded one-page image data to the conversion process (step S308) and encodes the one-page image data, which has been subjected to the conversion process, using the hard codec 110 (step S309). The CPU 101 then sends the encoded one-page image data to the communication destination using the communication unit 108 (step S310). After that, when execution of the image processing on the one-page image data by the hard codec 110 is completed, the CPU 101 determines whether or not an instruction to execute another job which requires use of the hard codec 110 has been received (step S312).

As a result of the determination in the step S312, when an instruction to execute another job which requires use of the hard codec 110 has been received, the CPU 101 switches the codec module for use in the IP-FAX communication job (step S313). Specifically, the CPU 101 switches from the hard codec 110, which has been used for the IP-FAX communication job, to the soft codec 111. As a result, in the IP-FAX communication job, although the processing time required for the encoding-decoding process is increased compared with the case where the hard codec 110 is used, the hard codec 110 is freed and made available for the other job. After that, the CPU 101 carries out the processes in the step S303 and the subsequent steps.

As a result of the determination in the step S312, when no instruction to execute another job which requires use of the hard codec 110 has been received, the CPU 101 determines whether or not a sending process on all of the image data for the IP-FAX communication job is completed (step S314).

As a result of the determination in the step S314, when the sending process on any of the image data for the IP-FAX communication job is uncompleted, the process returns to the step S307. On the other hand, as a result of the determination in the step S314, when the sending process on all of the image data for the IP-FAX communication job is completed, the CPU 101 frees the hard codec 110 (step S315) and ends the present process.

According to the process in FIG. 3 described above, when another job received while the hard codec 110 is in use for execution of the IP-FAX communication job (that is, while the steps S307 to S311 are in execution) requires use of the hard codec 110, the CPU 101 provides control as described hereafter. The CPU 101 switches the codec module for use in the IP-FAX communication job from the hard codec 110 to the soft codec 111. This prevents a shortage of the resources of the hard codec 110 resulting from shared use of the hard codec 110 by both the IP-FAX communication job and the other job. As a result, situations in which another job cannot be executed due to a shortage of resources are reduced.

Moreover, according to the process in FIG. 3 described above, immediately after execution of image processing on one-page image data by the hard codec 110 in the IP-FAX communication job being executed when another job was received is completed, the CPU 101 provides control as described hereafter. Namely, the CPU 101 provides control to switch the codec module with such timing that taking over in the IP-FAX communication job is easy. As a result, even if the control is provided to switch the codec module for use in the IP-FAX communication job, processing is efficiently continued for the IP-FAX communication job.

Furthermore, according to the process in FIG. 3 described above, a job being in execution is the IP-FAX communication job, and another job received during execution of the IP-FAX communication job is the print job. Namely, use of the hard codec 110 for the print job is given higher priority than to use of the hard codec 110 for the IP-FAX communication job. Here, when the codec module for use in the IP-FAX communication job is switched from the hard codec 110 to the soft codec 111, the processing time of the encoding-decoding process is increased, but execution of the IP-FAX communication job is continued. For this reason, even allowing use of the soft codec 111 for the IP-FAX communication job would not considerably decrease convenience for the user. On the other hand, when the resources of the hard codec 110 cannot be reserved for the print job, the print job is not executed until the resources of the hard codec 110 are reserved. This decreases convenience for the user. Namely, in order to prevent a considerable decrease in convenience for the user, it is preferred that use of the resources of the hard codec 110 for the print job is given higher priority than to use of the resources of the hard codec 110 for the IP-FAX communication job. Accordingly, in the present embodiment, use of the hard codec 110 for the print job is given higher priority than to use of the hard codec 110 for the IP-FAX communication job. This prevents a shortage of resources resulting from shared use of the hard codec 110 by multiple types of jobs, and at the same time, prevents a decrease in convenience for the user.

Although the present invention has been described by way of the embodiment, the present invention should not be limited to the embodiment described above.

For example, the user may be notified that the control to switch the codec module for use in an IP-FAX communication job has been provided. For example, a message saying that the processing time for the IP-FAX communication job will be increased due to switching of the codec module for use in the IP-FAX communication job from the hard codec 110 to the soft codec 111 may be displayed on the operating unit 104 or the like. This informs the user how the control to switch the codec module will influence the IP-FAX communication job.

Moreover, whether or not to provide the control to switch the codec module may be determined based on the number of resources of the hard codec 110 required by another job received during execution of the IP-FAX communication job and the number of remaining resources of the hard codec 110. For example, it is assumed that an IP-FAX communication job using two resources of the hard codec 110 is to be executed, and the number of remaining resources of the hard codec 110 is eight. In this case, when the number of resources of the hard codec 110 required by another job received during execution of the IP-FAX communication job is more than eight, there is a shortage of the resources of the hard codec 110, and hence the CPU 101 decides to provide the control to switch the codec module. On the other hand, when the number of resources of the hard codec 110 required by another job received during execution of the IP-FAX communication job is not more than eight, there is no shortage of the resources of the hard codec 110, and hence the CPU 101 decides not to provide the control to switch the codec module. As a result, the control to switch the codec module for use in the IP-FAX communication job is prevented from being unnecessarily provided. This prevents a decrease in the throughput of the IP-FAX communication job due to unnecessary execution of the control to switch the codec module.

Further, although in the embodiment described above, the determination process in the step S312 is carried out immediately after execution of image processing on one-page image data is completed, the timing with which the determination process in the step S312 is carried out is not limited to this. For example, the determination process in the step S312 may be carried with timing ideal for taking-over of image processing, for example, immediately after execution of JBIG processing on a stripe-by-stripe basis or a row-by-row basis is completed.

In the embodiment described above, codec setting information in which one of the hard codec 110 and the soft codec 111 is set in association with the communication destination of the IP-FAX communication job may be held.

Figure 4:
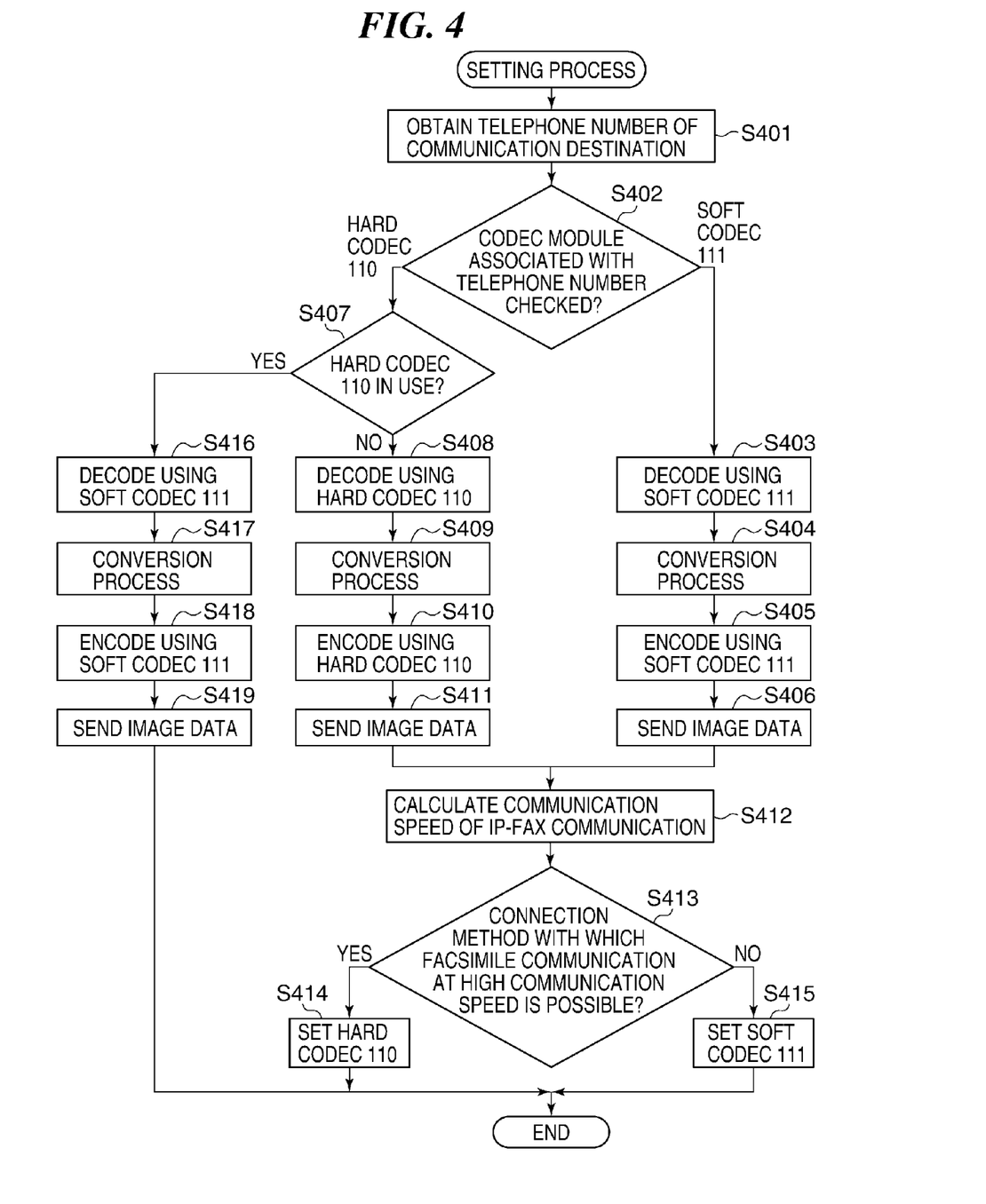
FIG. 4 is a flowchart showing the procedure of a setting process which is carried out by the MFP in FIG. 1.

FIG. 4 is a flowchart showing the procedure of a setting process which is carried out by the MFP 100 in FIG. 1.

The process in FIG. 4 is carried out by the CPU 101 executing a program stored in the ROM 102. The process in FIG. 4 is based on the assumption that the MFP 100 holds codec setting information in which one of the hard codec 110 and the soft codec 111 is set in association with a communication destination of the IP-FAX communication job.

Here, when the MFP 100 and an external apparatus which is to be communication destination are directly connected to an IP network, a high-speed facsimile communication between the MFP 100 and the external apparatus becomes possible. However, when the external apparatus is connected to the IP network via the analog telephone network, a facsimile communication is carried out between the MFP 100 and the external apparatus at low communication speed equivalent to that of the analog fax communication. In this case, it is preferred that even if an instruction to execute the IP-FAX communication job is received, the MFP 100 uses the soft codec 111, not the hard codec 110, so as to reduce shortages of the resources of the hard codec 110.

On the other hand, in the present embodiment, codec setting information in which one of the hard codec 110 and the soft codec 111 is set in association with a communication destination of the IP-FAX communication job is held.

Referring to FIG. 4, first, upon receiving an instruction to execute the IP-FAX communication job, the CPU 101 obtains a telephone number of the communication destination (step S401). Next, by referring to the codec setting information, the CPU 101 checks the codec module associated with the obtained telephone number (step S402).

As a result of the checking in the step S402, when the soft codec 111 is set in the codec setting information, the CPU 101 decodes image data using the soft codec 111 (step S403). Then, the CPU 101 subjects the decoded image data to the conversion process (step S404) and encodes the image data, which has been subjected to the conversion process, using the soft codec 111 (step S405). After that, the CPU 101 sends the encoded image data to the communication destination using the communication unit 108 (step S406) and carries out processes in step S412 and the subsequent steps, to be described later.

As a result of the checking in the step S402, when the hard codec 110 is set in the codec setting information, the CPU 101 determines whether or not the hard codec 110 is in use (step S407).

As a result of the determination in the step S407, when the hard codec 110 is not in use, the CPU 101 decodes the image data using the hard codec 110 (step S408). Then, the CPU 101 subjects the decoded image data to the conversion process (step S409) and encodes the image data, which has been subjected to the conversion process, using the hard codec 110 (step S410). The CPU 101 then sends the encoded image data to the communication destination using the communication unit 108 (step S411). The CPU 101 then calculates a communication speed of the IP-FAX communication based on a time period required for the IP-FAX communication and an amount of data communicated in the IP-FAX communication job (step S412). Based on the calculated communication speed, the CPU 101 then determines whether or not a connection method at the communication destination is a connection method with which a facsimile communication at high speed communication speed is possible (step S413). For example, in the step S413, the calculated communication speed and a set speed, which is set in advance and is slightly slower than an original IP-FAX communication speed, are compared with each other. When the calculated communication speed is higher than the set speed, the CPU 101 determines that the connection method at the communication destination is the connection method with which a facsimile communication at high speed communication speed equivalent to that of an IP-FAX communication is possible. On the other hand, when the calculated communication speed is lower than the set speed, the CPU 101 determines that the connection method at the communication destination is not the connection method with which facsimile communication at high speed communication speed equivalent to that of an IP-FAX communication is possible.

As a result of the determination in the step S413, when the connection method at the communication destination is the connection method with which facsimile communication at high speed communication speed is possible, the CPU 101 sets, in the codec setting information, the hard codec 110 in association with the telephone number obtained in the step S401 (step S414). After that, the CPU 101 ends the present process.

As a result of the determination in the step S413, when the connection method at the communication destination is not the connection method with which facsimile communication at high speed communication speed is possible, the CPU 101 sets, in the codec setting information, the soft codec 111 in association with the telephone number obtained in the step S401 (step S415). After that, the CPU 101 ends the present process.

As a result of the determination in the step S407, when the hard codec 110 is in use, the CPU 101 decodes the image data using the soft codec 111 (step S416). Then, the CPU 101 subjects the decoded image data to the conversion process (step S417) and encodes the image data, which has been subjected to the conversion process, using the soft codec 111 (step S418). The CPU 101 then sends the encoded image data to the communication destination using the communication unit 108 (step S419) and ends the present process.

In the process in FIG. 4 described above, the codec setting information in which one of the hard codec 110 and the soft codec 111 is set in association with the communication destination of the IP-FAX communication job is held. As a result, when the IP-FAX communication job for the communication destination is to be executed after the codec setting information is set, a codec module suitable for the communication destination is easily selected.

Moreover, in the process in FIG. 4 described above, the codec setting information is set based on a time period required for execution of the IP-FAX communication and an amount of data communicated in the IP-FAX communication job. As a result, even if a method of connecting with the communication destination of the IP-FAX communication job is unknown, it is possible to set the codec module suitable for the communication destination, and hence unnecessary use of the hard codec 110 for execution of the IP-FAX communication job is prevented.

It should be noted that although in the step S413 in the above described example, whether or not a connection method at the communication destination is a connection method with which the facsimile communication at high speed communication speed is possible is determined based on whether or not a communication speed is higher than a communication speed set in advance, the present invention is not limited to this. For example, the CPU 101 may receive information indicative of whether or not the communication destination is connected directly to the IP network or connected to the IP network via the analog telephone network, and based on this information, determine whether or not a connection method at the communication destination is a connection method with which the facsimile communication at high speed communication speed is possible.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-132535, filed Jul. 4, 2016, which is hereby incorporated by reference herein in its entirety.

What is claimed is:

1. An image processing apparatus that has a first codec that carries out an encoding process on image data, and a second codec that carries out an encoding process on the image data at higher speed compared with the first codec, comprising:
 a processor configured to cause the image processing apparatus to:
 perform an encoding process on a first type of job using the second codec; and
 stop, when a second type of job, which requires use of the second codec, is received while the second codec is being used to perform the encoding process on the first type of job, use of the second codec for performing the encoding process on the first type of job, and execute the encoding process on the first type of job using the first codec and an encoding process on the second type of job using the second codec in parallel.

2. The image processing apparatus according to claim 1, wherein the first type of job includes image processing on image data on a plurality of pages,
 wherein in response to execution of image processing on image data on one page being completed by the second codec in the first type of job being executed when the second type of job is received, the processor causes the image processing apparatus to switch the codec for use in the first type of job from the second codec to the first codec.

3. The image processing apparatus according to claim 1, wherein the processor is further configured to cause the image processing apparatus to notify a user that the execution of the encoding process on the first type of job has been switched from the second codec to the first codec.

4. The image processing apparatus according to claim 1, wherein the processor is further configured to cause the image processing apparatus to determine whether to stop the use of the second codec for performing the encoding process on the first type of job and execute the encoding process on the first type of job using the first codec based on a number of remaining resources of the second codec and a number of resources of the second codec required by the second type of job.

5. The image processing apparatus according to claim 1, wherein the first type of job is an IP-FAX communication job involving sending and receiving with IP-FAX, and
 the second type of job is a print job in which a printing process is carried out.

6. The image processing apparatus according to claim 5, wherein the processor is further configured to cause the image processing apparatus to hold setting information in which one of the first codec and the second codec is set in association with a communication destination of the IP-FAX communication job.

7. The image processing apparatus according to claim 6, wherein the setting information is set based on a communication time period required for execution of the IP-FAX communication job and an amount of data communicated in the IP-FAX communication job.

8. A control method for an image processing apparatus that has a first codec that carries out an encoding process on image data, and a second codec that carries out an encoding process on the image data at higher speed compared with the first codec, the control method comprising:
 performing an encoding process on a first type of job using the second codec; and
 stopping, when a second type of job, which requires use of the second codec, is received while the second codec is being used to perform the encoding process on the first type of job, use of the second codec for performing the encoding process on the first type of job, and executing the encoding process on the first type of job using the first codec and an encoding process on the second type of job using the second codec in parallel.

9. A non-transitory computer-readable storage medium storing a program for causing a computer to execute a control method for an image processing apparatus that has a first codec that carries out an encoding process on image data, and a second codec that carries out an encoding process on the image data at higher speed compared with the first codec,
 the control method for the image processing apparatus comprising:
 performing an encoding process on a first type of job using the second codec; and stopping, when a second type of job, which requires use of the second codec, is received while the second codec is being used to perform the encoding process on the first type of job, use of the second codec for performing the encoding process on the first type of job, and executing the encoding process on the first type of job using the first codec and an encoding process on the second type of job using the second codec in parallel.

10. An image processing apparatus that has a software codec that carries out an encoding process on image data, and a hardware codec, comprising:
a processor configured to cause the image processing apparatus to:
perform an encoding process on a first type of job using the hardware codec;
stop, when a second type of job, which requires use of the hardware codec, is received while the hardware codec is being used to perform the encoding process on the first type of job, use of the hardware codec for performing the encoding process on the first type of job, and execute the encoding process on the first type of job using the software codec and an encoding process on the second type of job using the hardware codec in parallel.

11. The image processing apparatus according to claim 10, wherein the first type of job includes image processing on image data on a plurality of pages,
wherein in response to execution of image processing on image data on one page being completed by the hardware codec in the first type of job being executed when the second type of job is received, the processor causes the image processing apparatus to switch the codec for use in the first type of job from the hardware codec to the software codec.

12. The image processing apparatus according to claim 10, wherein the processor is further configured to cause the image processing apparatus to notify a user that the execution of the encoding process on the first type of job has been switched from the hardware codec to the software codec.

13. The image processing apparatus according to claim 10, wherein the processor is further configured to cause the image processing apparatus to determine whether to stop the use of the hardware codec for performing the encoding process on the first type of job and execute the encoding process on the first type of job using the software codec based on a number of remaining resources of the hardware codec and a number of resources of the hardware codec required by the second type of job.

14. The image processing apparatus according to claim 10, wherein the first type of job is an IP-FAX communication job involving sending and receiving with IP-FAX, and the second type of job is a print job in which a printing process is carried out.

15. The image processing apparatus according to claim 14, wherein the processor is further configured to cause the image processing apparatus to hold setting information in which one of the software codec and the hardware codec is set in association with a communication destination of the IP-FAX communication job.

16. The image processing apparatus according to claim 15, wherein the setting information is set based on a communication time period required for execution of the IP-FAX communication job and an amount of data communicated in the IP-FAX communication job.

* * * * *